April 5, 1927.
D. E. GAMBLE
FRICTION CLUTCH
Filed Nov. 28, 1923
1,623,470
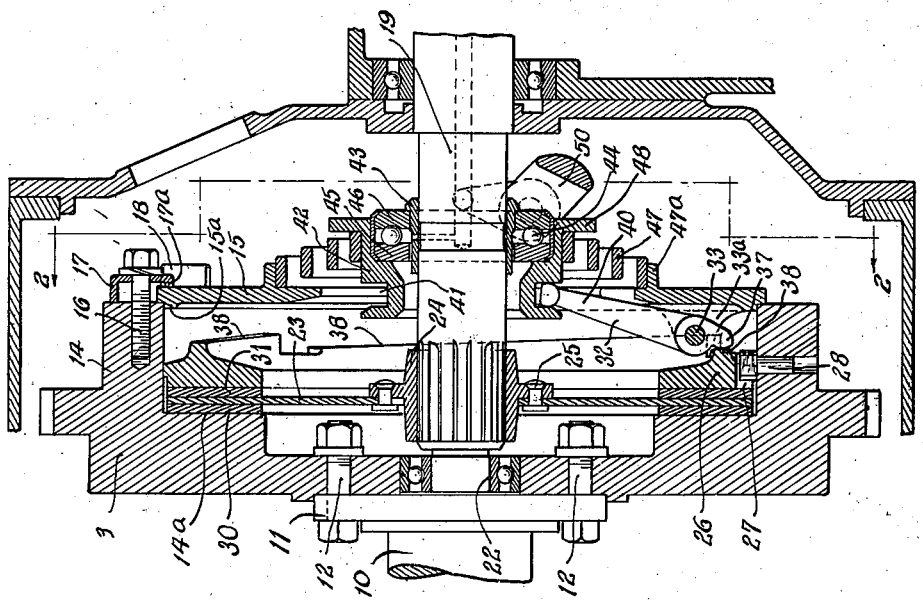
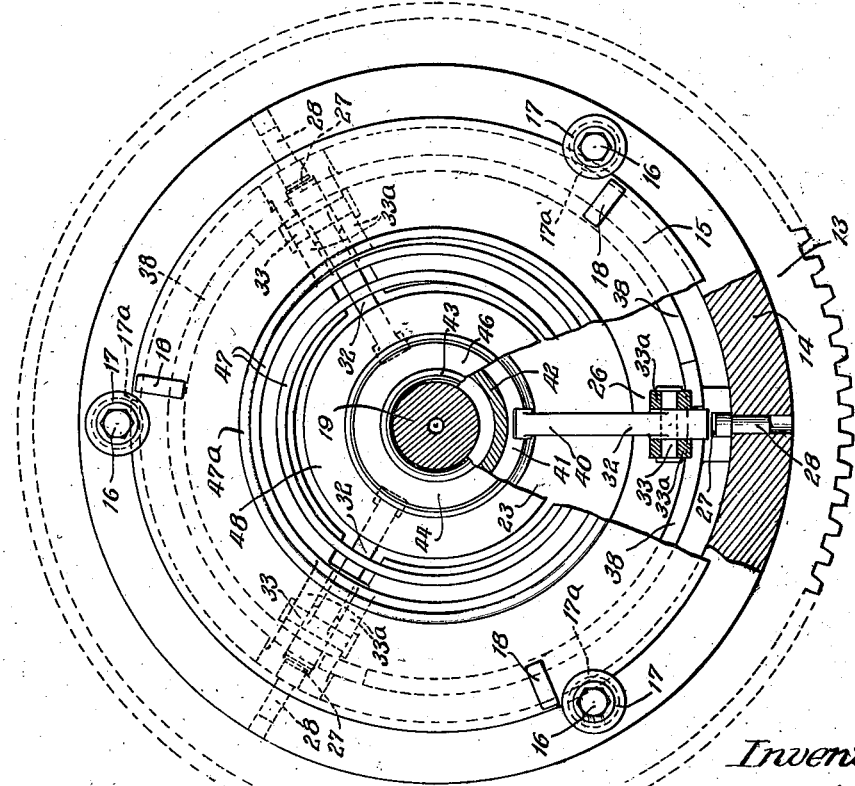
Inventor:
David E Gamble
By: Wm O. Bell
Atty.

Patented Apr. 5, 1927.

1,623,470

UNITED STATES PATENT OFFICE.

DAVID E. GAMBLE, OF CHICAGO, ILLINOIS, ASSIGNOR TO THE BORG & BECK COMPANY, OF CHICAGO, ILLINOIS, A CORPORATION OF ILLINOIS.

FRICTION CLUTCH.

Application filed November 28, 1923. Serial No. 677,385.

The main object of this invention is to provide improved construction for a friction clutch of the type shown and described in my co-pending application Serial No. 659,482, filed August 27, 1923, the friction clutch disclosed in that application being adapted to be incorporated in a motor driven vehicle or the like.

A more specific object of this invention is to provide a friction clutch of the character described having improved means for adjusting the clutch to take up wear between the driving and driven elements of the clutch, the improved adjusting means serving to reduce the number of parts required in the clutch and also serving to facilitate the task of the operator so that the clutch may be adjusted quickly and easily.

Other objects of my invention will become apparent as the detail description progresses, reference being had to the accompanying drawing, wherein Fig. 1 is a longitudinal section through a friction clutch embodying the novel features of my invention, and Fig. 2 is a section taken on line 2—2 of Fig. 1, the lower portion of the figure having parts broken away to better show certain details of the invention.

In the drawing, the reference character 10 designates a crank shaft of the type usually employed in internal combustion engines of self-propelled vehicles or the like. The crank shaft 10 is formed with an integral flange 11 to which is rigidly secured by bolts 12 a flywheel 13. The flywheel 13 is provided with an integral annular flange 14 which may be described as an annulus disposed concentrically and longitudinally with respect to the flywheel and with respect to a friction surface 14ª formed upon the flywheel. A centrally apertured plate 15 is provided with an annular shoulder 15ª which seats upon the outer edge of the annular flange 14, the construction being such that the apertured plate 15 may be defined as a plate rotatably journaled upon the annular flange 14. The apertured plate 15 may be secured in a plurality of angularly adjusted positions with respect to the annular flange 14 by means of a plurality of bolts 16 making screw threaded engagement with the annular flange 14. For that purpose, each of the bolts 16 is provided with a cup-shaped washer 17 having a shoulder 17ª adapted to make frictional engagement with a marginal portion of the apertured plate 15. It is apparent that the bolts 16 may be tightened to cause the washers 17 to hold the plate 15 in an angularly adjusted position. To facilitate angular displacement of the plate 15 with respect to the annular flange 14, I prefer to provide a plurality of outstanding lugs 18 on the apertured plate. When the apertured plate is to be brought to an adjusted position, it is only necessary for the operator to loosen the several bolts 16, after which, it will be a comparatively simple matter to rotate the apertured plate by means of the outstanding lugs. After the plate has been brought to its adjusted position it may be secured in this position by tightening the several bolts 16. The purpose of this construction will appear presently.

As best shown in Fig. 1, one end of a driven shaft 19 projects through the central aperture in the plate 15. This end of the driven shaft 19 is rotatably journaled in a pilot bearing 22 disposed in the driving end of the crank shaft 10, the axes of the crank shaft and the driven shaft being coincident. A friction disk 23 disposed intermediate the aforementioned friction surface 14ª and the plate 15 is splined to the driven shaft 19 by means of a sleeve 24 to which the friction disk 23 is rigidly secured by rivets 25. It is apparent that the driven shaft 19 will rotate with the friction disk 23 and that the friction disk 23 may be moved longitudinally of the driven shaft 19. Disposed concentrically with the friction disk 23 and adjacent thereto is a thrust ring 26 having a plurality of transverse slots 27 adapted to receive the heads of a plurality of pins 28 pressed or driven into the annular flange 14. The pins 28 cause the thrust ring 26 to rotate with the flywheel 13 but permit the thrust ring to be moved longitudinally of the flywheel 13 and the driven shaft 19. The reference characters 30 and 31 designate a pair of friction rings, the friction ring 30 being disposed between the friction surface 14ª and the friction disk 23, and the friction ring 31 being disposed between the friction disk 23 and the thrust ring 26.

To force the thrust ring 26 toward the friction surface 14ª so as to effect a driving engagement between the crank shaft 10 and the driven shaft 19, I provide a plurality of levers 32 which are arranged radially with respect to the coincident axes of the crank shaft 10 and the driven shaft 19. Each of the levers 32 is pivotally secured intermediate its ends by a pin 33 to the apertured plate 15, the apertured plate 15 being provided with a plurality of integral bearing lugs 33ª for this purpose. It is apparent that when the plate 15 is angularly adjusted with respect to the annular flange 14, the outwardly extending arms 37 of the levers 32 will be adjusted angularly with respect to the cammed thrust seats 38 formed upon the thrust ring 26. This construction will permit the distance between the thrust seat engaging surfaces of the arms 37 and the friction ring engaging surface of the thrust ring 26 to be increased, thus enabling the operator to adjust the clutch whenever it is necessary to take up wear between the driving and driven elements of the clutch.

The inwardly extending arm 40 of each of the levers 32 rides in an annular groove 41 turned in a collar 42 arranged concentrically with the axis of the driven shaft 19. The collar 42 is rotatably journaled upon a clutch throw-out sleeve 43 which is in turn rotatably journaled upon the driven shaft 19, a ball bearing 44 having inner and outer races 45 and 46 being interposed between the collar 42 and the sleeve 43. The collar 42 is provided with a flange 48 which forms a seat for a spiral spring 47 interposed between the flange 48 and the apertured plate 15, the apertured plate 15 having an outwardly projecting flange 47ª formed integral therewith for retaining the spring in its proper position. In the operation of the device, the spiral spring 47 will yieldingly hold the levers 32 in positions wherein they effect a driving engagement between the crank shaft 10 and the driven shaft 19, except when the operator throws out the clutch, which he does by means of a forked lever 50 in a manner well known to those skilled in the art.

The chief advantage of this construction is its simplicity and the ease with which the operator may adjust the clutch to take up wear between the driving and driven elements thereof. It has been described how the plate 15 serves as a support for the pivoted levers 32 and how it may be adjusted angularly with respect to the cammed thrust seats 38, thus making unnecessary the use of an additional ring or the like as shown and described in my co-pending application.

I am aware that changes in the form, construction and arrangement of parts may be made without departing from the spirit and without sacrificing the advantages of the invention and I reserve the right to make all such changes as fairly fall within the scope of the following claims:

I claim:

1. In a friction clutch, the combination of a driving element including an annulus disposed concentrically and longitudinally with respect to the rotary axis of the driving element, a centrally apertured plate seated upon the annulus, a plurality of shouldered washers adapted to frictionally engage the margin of the apertured plate, a plurality of bolts threadedly engaging the annulus for drawing the shouldered washers against the apertured plate to hold it in a plurality of angularly adjusted positions with respect to the annulus, a driven shaft, a driven element secured to rotate with the driven shaft, a thrust ring having a cammed thrust seat, means pivotally secured to the apertured plate and adapted to operatively engage the thrust seat, and yielding means cooperating with the pivotal means and the thrust ring for holding the driving and driven elements in frictional engagement.

2. In a friction clutch, the combination of a driving element including a rotatable friction member having an annular flange projecting longitudinally thereof and concentrically therewith, a centrally apertured plate seated upon the annular flange, the centrally apertured plate being of a diameter greater than the inside diameter of the annular flange, means carried by the annular flange and adapted to engage marginal portions of the apertured plate to clamp it in a plurality of angularly adjusted positions with respect to the annular flange, a driven shaft, a driven element secured to rotate with the driven shaft, a thrust ring having a cammed thrust seat, means pivotally secured to the apertured plate and adapted to operatively engage the thrust seat, and yielding means cooperating with the pivotal means and the thrust ring for holding the driving and driven elements in frictional engagement.

3. In combination, a driving shaft having a flywheel thereon, a driven shaft disposed co-axially with said driving shaft, a plate secured to said flywheel and being apertured for the passage of said driven shaft therethrough, friction elements disposed between said flywheel and said plate and adapted to co-operate with said flywheel and said driven shaft to operatively connect said shafts, radially disposed levers pivoted on the inner surface of said plate and controlling said friction elements, a collar slidable on said driven shaft and engaging said levers to operate the same, a thrust ring having cammed thrust seats for cooperation with said levers, and a spring disposed on the outer surface of said plate and between said plate and said collar, for the purpose set forth.

4. In combination, a driving shaft having a flywheel thereon, a driven shaft disposed co-axially with said driving shaft, a plate secured to said flywheel and being apertured for the passage of said driven shaft therethrough, friction elements disposed between said flywheel and said plate and adapted to co-operate with said flywheel and said driven shaft to operatively connect said shafts, a cam ring co-operating with said friction elements, levers pivoted on the inner surface of said plate and engaging said cam ring, a collar slidable on said driven shaft and engaging said levers to operate the same, a spring disposed on the outer surface of said plate and between said plate and said collar, and means for adjusting said plate in its plane to vary the points of contact of said levers with said cam ring.

5. In combination, a driving shaft having a flywheel thereon, a driven shaft disposed co-axially with said driving shaft, a plate secured to said flywheel and being apertured for the passage of said driven shaft therethrough, friction elements disposed between said flywheel and said plate and adapted to co-operate with said flywheel and said driven shaft to operatively connect said shafts, radially disposed levers pivoted on the inner surface of said plate and controlling said friction elements, a collar slidable on said driven shaft and engaging said levers to operate the same, a thrust ring having cammed thrust seats for cooperation with said levers, and a spring disposed on the outer surface of said plate and between said plate and said collar, said plate having an annular flange upon its outer surface to receive said spring, for the purpose set forth.

6. In combination, a driving shaft, a flywheel on said driving shaft and having an annulus thereon, a driven shaft disposed co-axially with said driving shaft, a plate having a shoulder received in said annulus to support the plate in position, said plate being apertured for the passage of said driven shaft therethrough, friction elements disposed between said flywheel and said plate and adapted to co-operate with said flywheel and said driven shaft to operatively connect said shafts, radially disposed levers pivoted on the inner surface of said plate and controlling said friction elements, a thrust ring having cammed thrust seats for cooperation with said levers, a collar slidable on said driven shaft and engaging said levers to operate the same, and a spring disposed on the outer surface of said plate and between said plate and said collar, for the purpose set forth.

7. In combination, a driving shaft, a flywheel on said driving shaft and having an annulus thereon, a driven shaft disposed co-axially with said driving shaft, a plate having a shoulder received in said annulus to support the plate in position, said plate being apertured for the passage of said driven shaft therethrough, friction elements disposed between said flywheel and said plate and adapted to co-operate with said flywheel and said driven shaft to operatively connect said shafts, a cam ring cooperating with said friction elements, levers pivoted on the inner surface of said plate and contacting with said cam ring, a collar slidable on said driven shaft and engaging said levers to operate the same, a spring disposed on the outer surface of said plate and between said plate and said collar, and means detachably securing said plate to said annulus whereby upon release of said securing means said plate may be rotated in its plane to adjust the points of contact of said levers with said cam ring.

8. In combination, a driving shaft having a flywheel thereon, a driven shaft disposed co-axially with said driving shaft, a plate carried by said flywheel and being apertured for the passage of said driven shaft therethrough, friction elements disposed between said flywheel and said plate and adapted to co-operate with said flywheel and said driven shaft to operatively connect said shafts, a cam ring co-operating with said friction elements, levers pivoted on the inner surface of said plate and engaging said cam ring, a collar slidable on said driven shaft and engaging said levers to operate the same, a spring disposed on the outer surface of said plate and between said plate and said collar, and means for securing said plate to said flywheel but capable of being loosened, whereby upon loosening of said securing means said plate may be adjusted in its plane to vary the points of contact of said levers with said cam ring.

9. In combination, a driving shaft having a flywheel thereon, a driven shaft disposed co-axially with said driving shaft, a plate carried by said flywheel and being apertured for the passage of said driven shaft therethrough, friction elements disposed between said flywheel and said plate and adapted to co-operate with said flywheel and said driven shaft to operatively connect said shafts, a cam ring co-operating with said friction elements, levers pivoted on the inner surface of said plate and engaging said cam ring, a collar slidable on said driven shaft and engaging said levers to operate the same, a spring disposed on the outer surface of said plate and between said plate and said collar, co-operating means on said flywheel and on said plate to maintain said plate in operative position, and means securing said plate to said flywheel against axial movement, said means capable of being loosened, whereby upon loosening of said securing means said plate may be adjusted in its plane to vary the points of contact of said levers with said cam ring.

DAVID E. GAMBLE.